UNITED STATES PATENT OFFICE 2,149,762

ETHYLATED-DI-ISOPROPYL BENZENE

Robert R. Dreisbach, Midland, Mich., assignor to The Dow Chemical Company, Midland, Mich., a corporation of Michigan No Drawing. Application July 18, 1936, Serial No. 91,428

5 Claims. (Cl. 260—671)

This invention concerns certain new organic products consisting essentially of benzene derivatives having the formula

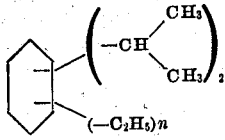

wherein $n$ is an integer not exceeding 4 and the benzene nucleus may contain halogen. Such compounds are hereinafter referred to generically as "ethylated di-isopropyl-benzene" compounds. The products are, in most instances, liquid mixtures of isomeric compounds having the above formula, although individual compounds may in some instances be obtained. All of the products are useful as organic solvents and as dielectric agents. Certain of them are adapted to special uses, e. g. as agents for incorporation in motor fuels such as gasoline containing lead tetra-ethyl, to increase the octane rating thereof. A mixture of isomeric diethyl-di-isopropyl-benzenes is disclosed in my copending application, Serial No. 16,216, filed April 13, 1935, of which the present application is a continuation in part.

My new products may be prepared in several ways, e. g. by reacting benzene, or a halobenzene containing not more than 3 halogen atoms, successively with ethylene and propylene in the presence of a Friedel-Craft catalyst, or by similar procedure using an ethyl halide, e. g. ethyl bromide or chloride, and an isopropyl halide as the alkylating agents. The ethylated di-isopropyl-halobenzenes may also be prepared by reacting benzene successively with ethylene and propylene, or the corresponding alkyl halides, to form an ethylated di-isopropyl-benzene containing not more than 5 alkyl groups and thereafter reacting the latter with a halogen, e. g. chlorine or bromine, under conditions such that the halogen enters the benzene ring rather than the alkyl radicals.

In practice I prefer to operate as follows:— Benzene and between 0.05 and 0.1 molecular equivalent of aluminum chloride, or other Friedel-Craft catalyst, are placed in a closed reactor provided with an agitator. Ethylene is then passed into the reactor at approximately room temperature while stirring the reaction mixture and maintaining the same under a moderate pressure, e. g. up to 100 pounds per square inch. Operation in such manner is continued until sufficient ethylene has been introduced to ethylate the benzene to a stage containing between 1 and 4 ethyl groups per molecule. The introduction of ethylene is then discontinued and propylene is added to the mixture under the conditions stated above until approximately 2 moles of propylene have been added per mole of the benzene initially employed. The introduction of propylene is then stopped and the mixture is allowed to stand for some time, e. g. 0.5 hour or longer. During this period a heavy sludge layer containing the catalyst usually settles to the bottom of the reactor. This heavy layer is drawn off for re-employment as a catalyst in successive reactions and the clear supernatant layer containing the ethylated di-isopropyl-benzene is washed with water and neutralized with an aqueous alkali. It is then dried and fractionally distilled to separate the ethylated di-isopropyl-benzene product. The product so obtained is a liquid usually consisting of a mixture of isomeric ethylated di-isopropyl-benzene compounds. It contains two isopropyl radicals and from one to four ethyl groups per molecule.

If desired, instead of first ethylating benzene to the monoethyl-tetraethyl benzene state, as described above, and thereafter reacting the mixture with propylene, an individual monoethyl-, diethyl-, triethyl-, or tetraethyl-benzene from any source may be reacted with propylene in the presence of a Friedel-Craft catalyst to form the ethylated di-isopropyl-benzene product. The latter is more easily purified when prepared in such manner than when prepared using crude ethylated benzene, i. e. the undistilled mixture obtained by the ethylation of benzene, as a starting material.

When the ethylated di-isopropyl-benzene product contains not more than 3 ethyl groups per molecule, it may be reacted with chlorine or bromine at moderate temperatures, e. g. temperatures not exceeding 50° C., in the presence of iron and in the dark to obtain a corresponding mixture of nuclear halogenated ethylated di-isopropyl-benzene compounds. This product also is a liquid at room temperatures. It is particularly useful as a dielectric agent.

The following examples illustrate a number of ways in which the principle of the invention has been employed but are not to be construed as limiting the invention:—

Example 1

A mixture of 20 pounds, 10 ounces of ethyl benzene and 1.5 pounds of aluminum chloride was placed in a closed reactor provided with a mechanical stirrer. Propylene was then introduced to the mixture while agitating and maintaining the latter at temperatures between 20° and 30° C. until 10 pounds, 10 ounces of propylene had been added. After all of the propylene had been added the mixture was permitted to settle, the sludge layer thereof was separated and the remaining material was washed successively with water and aqueous alkali, dried, and fractionally distilled, the fraction distilling between 210° C. and 223° C. being collected. This fraction was redistilled, whereby a mixture of isomeric monoethyl-di-isopropyl-benzenes was separated. The mixture boiled at approximately 227° C. under 744 millimeters pressure and had an index of refraction of 1.4898 at 25° C. and a specific gravity of 0.857 at 25° C. with respect to water at the same temperature. On analysis it was found to contain 11.6 per cent of hydrogen and 88.4 per cent of carbon, which corresponded very closely to theoretical.

Example 2

A mixture of 6780 grams of di-ethyl-benzene and 454 grams of aluminum chloride was treated at approximately 20° C. with 3902 grams of propylene, the procedure being similar to that employed in Example 1. The mixture was then permitted to settle, the sludge layer was drawn off and the supernatant layer was washed with water, neutralized, dried, and fractionally distilled, whereby 1300 grams of diethyl-di-isopropyl-benzene was obtained. The product had the following properties:— Boiling point range—250°–255° C. at 750 millimeters pressure; viscosity at 60° F.—95.1 millipoises, at 100° F.—41.1 millipoises; index of refraction—1.4968 at 25° C.; specific gravity at 60° F. (15.6° C.)—0.875, at 100° F. (37.8° C.)—0.863. The product contained 11.8 per cent by weight of hydrogen and 88.2 per cent of carbon, which corresponded closely to theoretical.

Example 3

Triethyl-benzene, which had been formed by reacting ethylene with benzene and distilling the product, was treated with propylene in the presence of aluminum chloride to form a mixture comprising triethyl-di-isopropyl-benzene. The product was then separated as in Example 1. Two fractions of said product were obtained, viz., a fraction boiling at about 284° C. under 744 millimeters pressure and having a specific gravity of 0.886 at 25° C. with respect to water at the same temperature and another fraction boiling at about 278° C. under 748 millimeters pressure and having a specific gravity of 0.882 at 25° C. Both of said products were permanent liquids analyzing correctly as triethyl-di-isopropyl-benzene, being mixtures of isomeric compounds.

Example 4

A mixture of 305 grams of the diethyl-di-isopropyl-benzene product described in Example 2, 100 grams of glacial acetic acid, 50 grams of sodium acetate, and 15 grams of iron filings was stirred and maintained at approximately 40° C. while 198.5 grams of chlorine gas was gradually passed thereinto. The mixture was then washed with water, dried and fractionally distilled. There was separated a fraction boiling at approximately 284° C. under 741 millimeters pressure and having an index of refraction of 1.5196 at 25° C. and a specific gravity of 0.985 at 25° C. with respect to water at the same temperature. This fraction was found on analysis to be diethyl-di-isopropyl-mono-chlorobenzene. It was a liquid at room temperature.

Example 5

A mixture of 227 grams of diethyl-di-isopropyl-benzene, 150 grams of glacial acetic acid, 50 grams of sodium acetate and 10 grams of iron filings was stirred and maintained at temperatures between 40° and 45° C. while 92 grams of bromine was gradually added thereto. The mixture was then washed and fractionally distilled whereby a fraction was separated which boiled at about 296° C. under 742 millimeters pressure, had an index of refraction of 1.5324 at 25° C. and a specific gravity of 1.143 at 25° C. with respect to water at the same temperature, and analyzed correctly as diethyl-di-isopropyl-bromo-benzene. It was a liquid at room temperature.

Example 6

A mixture of 393 grams of diethyl-di-isopropyl-benzene, 200 grams of glacial acetic acid, 50 grams of sodium acetate and 10 grams of iron filings was treated with 217 grams of bromine at temperatures between 40° and 50° C., the bromine being added to the mixture gradually and with stirring. After all of the bromine had been added, the mixture was washed, dried and fractionally distilled whereby a fraction was separated which boiled at 321° C. under 745 millimeters pressure, had an index of refraction of 1.5597 at 25° C. and a specific gravity of 1.386 at 25° C. with respect to water at the same temperature and analyzed correctly as diethyl-di-isopropyl-dibromo-benzene. The product was a liquid at room temperature.

Other modes of applying the principle of my invention may be employed instead of those explained, change being made as regards the method or compounds herein disclosed, provided the steps or compounds stated by the following claims or the equivalent of such stated steps or compounds be employed.

I therefore particularly point out and distinctly claim as my invention:—

1. A compound having the general formula

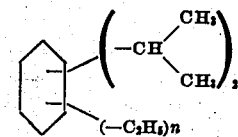

wherein $n$ is an integer not exceeding 4.

2. A liquid mixture of compounds having the general formula

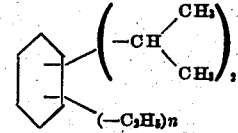

wherein $n$ is an integer not exceeding 4.

3. A mixture of isomeric monoethyl-di-isopropyl-benzenes having a boiling point of appromiately 227° C. at 744 millimeters pressure and the specific gravity of about 0.857 at 25° C. with respect to water at the same temperature.

4. A mixture of isomeric diethyl-di-isopropyl-benzenes having a boiling point in the range between 250° and 255° C. at 750 millimeters pressure.

5. A mixture of isomeric triethyl-di-isopropyl-benzenes having a boiling point of approximately 277.6° C. at 748 millimeters pressure and having a specific gravity of about 0.882 at 25° C. with respect to water at the same temperature.

ROBERT R. DREISBACH.